(12) United States Patent
Rifaat et al.

(10) Patent No.: US 11,810,091 B2
(45) Date of Patent: *Nov. 7, 2023

(54) PAYMENT DEVICE

(71) Applicant: Visa Europe Limited, London (GB)

(72) Inventors: Omar Rifaat, London (GB); David Wilson, London (GB)

(73) Assignee: Visa Europe Limited, London (GB)

( * ) Notice: Subject to any disclaimer, the term of this patent is extended or adjusted under 35 U.S.C. 154(b) by 35 days.

This patent is subject to a terminal disclaimer.

(21) Appl. No.: 17/475,735

(22) Filed: Sep. 15, 2021

(65) Prior Publication Data

US 2022/0005010 A1 Jan. 6, 2022

Related U.S. Application Data

(63) Continuation of application No. 16/706,515, filed on Dec. 6, 2019, now Pat. No. 11,151,537, which is a (Continued)

(30) Foreign Application Priority Data

Dec. 14, 2010 (GB) ...................................... 0921776

(51) Int. Cl.
*G06Q 20/20* (2012.01)
*G06Q 20/34* (2012.01)
(Continued)

(52) U.S. Cl.
CPC ......... *G06Q 20/202* (2013.01); *G06Q 20/045* (2013.01); *G06Q 20/326* (2020.05);
(Continued)

(58) Field of Classification Search
CPC ............... G06Q 20/202; G06Q 20/045; G06Q 20/3278; G06Q 20/341; G06Q 20/352;
(Continued)

(56) References Cited

U.S. PATENT DOCUMENTS

| 6,107,932 A | 8/2000 | Walker et al. |
| 6,192,349 B1 | 2/2001 | Husemann et al. |

(Continued)

FOREIGN PATENT DOCUMENTS

| AU | 723561 | 8/2000 |
| CN | 101405776 | 4/2009 |

(Continued)

OTHER PUBLICATIONS

Inglesant, P; Sasse, MA; (2007) Usability is the best policy: Public policy and the lived experience of transport systems in London. (Year: 2007).*

(Continued)

*Primary Examiner* — Virpi H Kanervo
(74) *Attorney, Agent, or Firm* — Kilpatrick Townsend & Stockton LLP

(57) ABSTRACT

A program for running on a processor of a portable payment device is adapted for carrying out a payment interaction and permitting ticket storage in a memory of the portable payment device. The program is configured to interact with an access point and includes a set of instructions, a first code portion and a second code portion. The set of instructions, when executed by the processor, causes the portable payment device to perform the steps of: responsive to a first message from said access point, executing the first code portion; and responsive to a second message from the access point, executing the second code portion. The first code portion includes first instructions corresponding to the payment interaction. The second code portion includes instructions corresponding to the payment interaction and second instructions corresponding to the ticket interaction.

20 Claims, 5 Drawing Sheets

Related U.S. Application Data continuation of application No. 13/523,759, filed on Jun. 14, 2012, now Pat. No. 10,528,933, which is a continuation of application No. PCT/EP2010/069676, filed on Dec. 14, 2010.

(51) Int. Cl.
*G06Q 20/04* (2012.01)
*G06Q 20/32* (2012.01)
*G06Q 20/40* (2012.01)
*G07F 7/10* (2006.01)

(52) U.S. Cl.
CPC ....... *G06Q 20/3278* (2013.01); *G06Q 20/341* (2013.01); *G06Q 20/352* (2013.01); *G06Q 20/3563* (2013.01); *G06Q 20/3574* (2013.01); *G07F 7/1008* (2013.01); *G06Q 20/40* (2013.01)

(58) Field of Classification Search
CPC .......... G06Q 20/3563; G06Q 20/3574; G06Q 20/40; G07F 7/1008
See application file for complete search history.

(56) References Cited

U.S. PATENT DOCUMENTS

| | | | |
|---|---|---|---|
| 6,564,257 | B1 | 5/2003 | Emens et al. |
| 7,096,205 | B2 | 8/2006 | Hansen et al. |
| 7,103,577 | B2 | 9/2006 | Blair et al. |
| 7,117,183 | B2 | 10/2006 | Blair et al. |
| 7,184,989 | B2 | 2/2007 | Hansen et al. |
| 7,280,981 | B2 | 10/2007 | Huang et al. |
| 7,413,113 | B1* | 8/2008 | Zhu ........................ G06Q 20/12 235/375 |
| 7,527,208 | B2 | 5/2009 | Hammad et al. |
| 7,562,051 | B1 | 7/2009 | Donner |
| 7,580,897 | B2 | 8/2009 | Sakamura et al. |
| 8,025,223 | B2 | 9/2011 | Saunders et al. |
| 8,225,997 | B1* | 7/2012 | Bierbaum .......... G06Q 20/3278 235/382 |
| 8,770,470 | B2 | 7/2014 | Hammad et al. |
| 10,102,569 | B1 | 10/2018 | Kawan et al. |
| 10,121,139 | B2 | 11/2018 | Pitroda et al. |
| 10,528,933 | B2 | 1/2020 | Rifaat et al. |
| 2001/0018660 | A1 | 8/2001 | Sehr |
| 2002/0152175 | A1 | 10/2002 | Armstrong et al. |
| 2003/0019927 | A1 | 1/2003 | Lindgren et al. |
| 2004/0059685 | A1 | 3/2004 | Sakamura et al. |
| 2004/0139021 | A1 | 7/2004 | Reed et al. |
| 2004/0140351 | A1 | 7/2004 | Flugge et al. |
| 2007/0012763 | A1 | 1/2007 | Van De Velde et al. |
| 2008/0011833 | A1 | 1/2008 | Saarisalo |
| 2008/0116264 | A1 | 5/2008 | Hammad et al. |
| 2008/0128513 | A1 | 6/2008 | Hammad et al. |
| 2008/0179394 | A1 | 7/2008 | Dixon et al. |
| 2008/0179395 | A1 | 7/2008 | Dixon et al. |
| 2008/0183565 | A1 | 7/2008 | Dixon et al. |
| 2008/0183622 | A1 | 7/2008 | Dixon et al. |
| 2008/0201212 | A1 | 8/2008 | Hammad et al. |
| 2008/0203152 | A1 | 8/2008 | Hammad et al. |
| 2008/0203170 | A1 | 8/2008 | Hammad et al. |
| 2008/0208681 | A1 | 8/2008 | Hammad et al. |
| 2008/0306849 | A1 | 12/2008 | Johnson, Jr. et al. |
| 2009/0184163 | A1 | 7/2009 | Hammad et al. |
| 2009/0216568 | A1* | 8/2009 | Raufaste .............. G06Q 20/045 705/5 |
| 2009/0227282 | A1 | 9/2009 | Miyabayashi et al. |
| 2009/0239512 | A1 | 9/2009 | Hammad et al. |
| 2009/0293062 | A1 | 11/2009 | Amir et al. |
| 2010/0017152 | A1 | 1/2010 | Potter et al. |
| 2010/0145855 | A1 | 6/2010 | Fordyce, III et al. |
| 2010/0161404 | A1 | 6/2010 | Taylor et al. |
| 2010/0252624 | A1 | 10/2010 | Van de Velde et al. |
| 2010/0275267 | A1 | 10/2010 | Walker et al. |
| 2010/0291896 | A1 | 11/2010 | Corda |
| 2011/0016054 | A1 | 1/2011 | Dixon et al. |
| 2011/0016275 | A1 | 1/2011 | Lemonnier et al. |
| 2011/0153495 | A1 | 6/2011 | Dixon et al. |
| 2011/0165836 | A1 | 7/2011 | Dixon et al. |
| 2011/0302081 | A1 | 12/2011 | Saunders et al. |
| 2012/0290422 | A1 | 11/2012 | Bhinder |
| 2015/0206130 | A1 | 7/2015 | Fisher |

FOREIGN PATENT DOCUMENTS

| | | |
|---|---|---|
| EP | 0644513 | 3/1995 |
| EP | 0949595 | 10/1999 |
| EP | 0969426 | 1/2000 |
| EP | 1918867 | 5/2008 |
| EP | 2513848 | 8/2017 |
| GB | 2443489 | 5/2008 |
| JP | 2010098367 | 4/2010 |
| KR | 20020087057 A | * 11/2002 |
| WO | 03032172 | 4/2003 |
| WO | 2007008915 | 1/2007 |
| WO | 2008039796 | 4/2008 |
| WO | 2008070642 | 6/2008 |
| WO | 2008106557 | 9/2008 |
| WO | 2011066395 | 6/2011 |
| WO | 2011073216 | 6/2011 |

OTHER PUBLICATIONS

"Integrated Fare Management", ISO TC204 WG8, Concepts and Definitions for Proposed Work Item—Public Transport Requirements for Use of Payment for Fare Media, Jul. 2009, 24 pages.

"New Work Item Proposal", ISO Proposal—South African National Standards Body, 2009, pp. 1-4.

"NFC Data Exchange Format (NDEF)", Technical Specification, NFC ForumTM, NFCForum-TS-NDEF_1.0, Jul. 24, 2006.

"Octopus Card", Available Online at http://www.optopuscards.com/consumer/products/en/index.jsp - 2005, 2005, 1 page.

U.S. Appl. No. 13/523,759, Final Office Action, dated Jul. 20, 2018, 16 pages.

U.S. Appl. No. 13/523,759, Non-Final Office Action, dated Mar. 7, 2019, 11 pages.

U.S. Appl. No. 13/523,759, Non-Final Office Action, dated Feb. 16, 2018, 20 pages.

U.S. Appl. No. 13/523,759, Notice of Allowance, dated Aug. 29, 2019, 17 pages.

U.S. Appl. No. 14/028,164, Advisory Action, dated Nov. 21, 2019, 6 pages.

U.S. Appl. No. 14/028,164, Final Office Action, dated Jun. 1, 2018, 14 pages.

U.S. Appl. No. 14/028,164, Final Office Action, dated Aug. 6, 2019, 25 pages.

U.S. Appl. No. 14/028,164, Non-Final Office Action, dated Nov. 14, 2018, 22 pages.

U.S. Appl. No. 14/028,164, Non-Final Office Action, dated Nov. 26, 2018, 22 pages.

U.S. Appl. No. 14/028,164, Non-Final Office Action, dated Sep. 3, 2020, 27 pages.

U.S. Appl. No. 16/706,515, Non-Final Office Action, dated Jan. 7, 2021, 7 pages.

U.S. Appl. No. 16/706,515, Notice of Allowance, dated Jun. 17, 2021, 10 pages.

EP10798289.4, "Minutes of the Oral Proceedings", Feb. 7, 2017, 39 pages.

EP10798289.4, "Search Report", dated Nov. 3, 2017, 12 pages.

Finzgar et al., "Use of Nfc and QR Code Identification in an Electronic Ticket System for Public Transport", Softcom 2011,19th International Conference on Software, Nov. 1, 2011.

Garner et al., "XEPS—Enabling Card-Based Payment for Mobile Terminals", IEEE International Symposium on Consumer Electronics, Jan. 2006, 6 pages.

GB0921776.1, "Search Report", dated Oct. 15, 2010, 1 page.

GB0921776.1, "Search Report", dated Apr. 14, 2010, 2 pages.

(56) References Cited

OTHER PUBLICATIONS

Application No. PCT/EP2010/069676, International Search Report and Written Opinion, dated Mar. 22, 2011, 9 pages.

* cited by examiner

PAYMENT DEVICE

CROSS-REFERENCE TO RELATED APPLICATIONS

This application is a continuation of U.S. patent application Ser. No. 16/706,515 filed on Dec. 6, 2019, which is a continuation of U.S. patent application Ser. No. 13/523,759 filed on Jun. 14, 2012, now issued as U.S. Pat. No. 10,528,933, which is a continuation under 35 U.S.C. § 120 of International Application No. PCT/EP2010/069676, filed on Dec. 14, 2010 (and published in the English language as WO 2011/073216 A1 on Jun. 23, 2011), which claims priority to GB Application No. 0921776.1, filed on Dec. 14, 2009. Each of the above-referenced applications is hereby incorporated by reference in its entirety.

BACKGROUND OF THE INVENTION

Field of the Invention

This application relates to a program for a smartcard, a smartcard and a method for writing, using and updating tickets stored on a smartcard.

Description of the Related Technology

Electronic payment cards such as credit and debit cards are a ubiquitous form of payment for goods and services. Modern cards have one or more microchips embedded within them and are often referred to as smartcards. The microchip may be powered up when the smartcard is inserted into a suitable reader. A contactless card needs merely be held near the reader and the microchip is powered up by inductive or capacitive coupling techniques. As contactless technology has developed and gained wider acceptance, microchips have been inserted into other devices such as key fobs, key rings and mobile phones. A mobile phone may contain an application that performs payment processing in a similar manner to a contactless smartcard, and typically a payment terminal is unaware of how a given payment device is physically embodied. Thus the term 'payment device' is regarded as including smartcards, key fobs, key rings and mobile phones.

Smartcards can be used for storing records with data. The data may relate to the cardholder or to a payment transaction but is not limited thereto. The records are called 'tickets' because of their common use for storing other than payment information, such as travel information, on smartcards and to distinguish them from records used for storing payment related data.

Present day smartcards using tickets are often used in a closed payment system, i.e. a relatively narrow field of card acceptors defined by the card issuer. For example, a transport system operator may issue payment cards that can only be used for payment of travel on the system. A hotel chain may have its own smartcards for recording room preferences of the cardholder and any loyalty scheme data such as regular guest bonus points.

It would be desirable if the use of a smartcard with ticketing could be used in an open payment system and not be restricted to such narrow fields but be extended over several fields, thereby reducing the number of cards the user must carry and improving the convenience of use. U.S. Pat. No. 7,527,208 B2 describes a smartcard that allows card acceptors to write ticket data onto the smartcard in their proprietary format, thereby admitting new card acceptors for ticketing even after issue of the card. The card incorporates a payment and a transit application. A disadvantage of this known smartcard is its relatively slow speed of operation, which may affect its use in contactless access points near gates, where the transit time of the card holder is short.

It is an object of the present invention to provide a program for a payment device having a higher speed of operation but maintaining compatibility with access points without ticket interaction.

SUMMARY

In accordance with embodiments of the present invention, there is provided a program, a method, a portable payment device and an access point for carrying out payment interaction and permitting ticket storage according to the appended claims.

More specifically, in a first aspect of the invention there is provided a program for running on a processor of a portable payment device for carrying out a payment interaction and permitting ticket storage in a memory of the portable payment device, the program being configured to interact with an access point and including a set of instructions, a first code portion and a second code portion, the set of instructions, when executed by the processor, causing the portable payment device to perform the steps of:

responsive to a first message from said access point, executing the first code portion; and responsive to a second message from the access point, executing the second code portion, the first code portion including first instructions corresponding to the payment interaction, and the second code portion including instructions corresponding to the payment interaction and second instructions corresponding to the ticket interaction.

The payment device is preferably a broadly accepted device for payment in an open system, such as a debit, credit or prepaid card of a well-known card association.

In embodiments of the invention, the program is configured such that the set of instructions controls the receipt of and response to messages from the access point, and indeed invocation of the first and second code portions in dependence on the content of the first and second messages. More specifically, when the payment device interacts with an access point, such as a point-of-sale (POS), where no ticket interaction is required, the access point commences a payment interaction with the payment device, for example by means of the first message, or command, sent to the payment device. In response to receipt of the first message, the payment device invokes the first code portion, whose instructions may correspond to a known payment algorithm. This therefore provides compatibility of the new payment device according to the invention with existing access points that can only carry out payment interactions.

When the payment device interacts with an access point provided with the added option of ticketing and the payment device is ticketing-enabled, the access point may commence a combined payment and ticketing interaction with the payment device, for example by means of the second message. In response to receipt of the second message, the payment device invokes the second code portion, namely the code controlling payment interaction and ticket interaction. This second code portion integrates payment and ticket interaction in a single application as an atomic executable. This avoids the need to switch from a payment application to a ticket application, each of which has to be invoked separately by the chip within a single interaction with an access point, thereby allowing completion of the payment and ticket interactions within a relatively short transit time of the card holder.

In preferred arrangements, the payment functionality, i.e. first instructions, of the first code portion is identical to payment functionality of the second code portion. Furthermore, in at least one arrangement, execution of the second code portion involves execution of part or all of first code portion. More specifically, in at least some embodiments, the first instructions making up the first code portion can be common to the first code portion and the second code portion, meaning that there is only one and the same instance of code that is executed when effecting payment in either case. This arrangement is particularly advantageous because it avoids duplicating the storage of executable portions common to the payment interaction and the payment plus ticketing interaction. Alternatively there may be two instances of the payment functionality: one embodied within the first code portion, and another embodied separately in the second code portion and combined with the second instructions corresponding to the ticket interaction.

Integrating the ticketing and payment functionality within a unitary code portion advantageously reduces risk that the card will be removed from the electromagnetic field before both the ticketing and payment interactions have been completed. This applies in particular where the code portions are defined according to the ISO/IEC 7816-4 standard, requiring specific starting steps and closure steps to be carried out when starting and closing an application. The short transit time is especially relevant for contactless access points such as in transit systems, where many customers must be able to pass in a short period. Another advantage of the combined payment-ticketing implementation is that the payment device can access both payment data and ticket data in its memory via execution of this unitary code portion running on the payment device, thus increasing the speed with which the single action with the access point can be completed.

It should be noted that the limited power of the chip of the payment device does not permit applications to run in parallel or multi-tasking but only sequentially. The abovementioned starting and closing steps serve to define and delineate different code portions on the payment device.

In operation, the second code portion may include various interactions, for example a payment transaction where the amount to be paid is determined by data in a ticket; a payment transaction where the amount is not determined by data in a ticket but where information is recorded in a ticket, such as bonus points; and an interaction with only one or more tickets. The ticket interaction provided by the second instructions may include writing, reading and deleting ticket data. When executed by the processor of the payment device, the instructions corresponding to the second code portion invoke steps of the payment interaction that are carried out when a ticket interaction is required. This enables execution of the standard payment interaction using the existing infrastructure and having the ticketing as an add-on to the payment interaction.

As a result, implementation of ticket interaction in an existing payment system, e.g. for credit, debit or prepaid cards, is thereby simplified and existing access points need only minor modification for adding the ticketing option. Similarly, but in reverse, existing transit access points that currently permit access to a transit network on the basis of closed loop transit cards only require minor modification in order to incorporate the payment option.

Since the ticket interaction between the payment device and the access point is based on a payment interaction that is shared by all card acceptors, the payment device is very flexible in that new card acceptors can be added without reprogramming the payment device. The addition of a ticketing transaction to an existing payment transaction is a relatively minor modification, and the broad acceptance of the payment application in different fields facilitates the acceptance of the use of ticketing in the payment device in different fields of use, such as airline, car rental and hotel applications. This is further facilitated by the fact that the memory on the smartcard is not pre-formatted with a ticket structure specified by an issuer of the payment device, meaning that the card acceptor can define the ticket structure and content based on their requirements. This makes the solution 'universal'.

The first instructions of the first code portion, which relate to the payment interaction, usually cause the processor of the payment device to execute all steps of the payment interaction necessary to complete a payment transaction. The payment instructions associated with the second code portion may cause the processor of the payment device to execute all steps necessary to complete a payment transaction, but in special cases one or more steps of the payment interaction may be omitted. For example, a payment interaction may omit the step of payment processing but include the step of the payment interaction providing an electronic signature to prove that the payment device is genuine.

For the purpose of this invention, a ticket is a record in a smartcard in which data can be stored, such as data relating to a payment or to the cardholder. Examples of tickets are: entrance ticket, travel ticket, bonus points, loyalty scheme data, concessionary data, discount ticket, etc. Data relating to the payment transaction are stored in tickets in a region dedicated to the payment transaction. This data may include data used in the authentication or verification processes for the payment transaction, including the user's personal identification number (PIN) and payment account number.

Card acceptors include, among others, merchants who accept payment by the payment device for goods or services they provide; transit operators; charities, who accept payment without providing goods or services; and authorities, who may record data such as old age pensioners' concessions.

In a preferred embodiment of the invention, the set of instructions executed by the processor of the payment device cause the payment device to identify the first message or the second message on the basis of the content of data contained therein. For example, a message received from the access point data is identified as relating to the payment interaction and the ticket interaction, and thus as the second message, on the basis of parameter values contained within the received message. Preferably each of the first message and the second message is embodied as a single processing command. The transfer of both messages by a single command from the access point to the payment device reduces the time required for data interchange. As regards the payment and ticketing interaction, such a transfer (i.e. via a single command) is only feasible when the payment and ticket interactions are integrated in a single application such as is provided in embodiments of the invention. In a similar way, data generated by the payment device and relating to payment and ticketing can be transferred from the payment device after execution of the second code portion to the access point for processing by combining the data in one processing command.

In at least some arrangements the second code portion can process zero-sum transactions, in which case an amount of payment processed in the payment interaction is preferably set to zero. These arrangements are particularly suitable in scenarios where the communication is between the smartcard and a reader, such as is commonly utilized by inspectors employed by transport networks and the like.

In a closed payment system, the single card issuer may provide all access points and cards with symmetric keys that can be used to encrypt the data transferred between the access points and the payment devices. Use of such an encryption method in an open system with a plurality of card issuers would require each access point to contain the keys of all card issuers, which is impracticable. Another possibility is to use asymmetric keys in an open system; however, encryption using such keys requires a relatively large amount of calculation. Therefore, in an open payment system the payment device preferably stores ticket data transferred in an encoded form from the access point to the payment device in the second region in the same encoded form. The encoding is controlled by the access point and the payment device is used as a container for the encoded ticket data; no decoding or encoding is carried out on the payment device. The data in the ticket may be additionally protected against modification or removal by a lock.

The memory of the payment device preferably includes a first region for storing a directory having entries for identifying card acceptors and a second region for storing tickets of the card acceptors, the second region being dynamically configurable. The directory is used as an interface between the access point and the second region of the memory where the tickets are stored, and is to be understood as different from the actual tickets themselves. The dynamic configurability of the second region allows card acceptors to write their own format of tickets, including any directory structure. The ability to add tickets from a new card acceptor after issue of the payment device makes the device very flexible.

The directory advantageously has a predetermined format, preferably determined by the card association, such as Visa, or standardized, i.e. endorsed by an international standards body, such as the ISO. The open, predetermined format allows any card acceptor to enter a new entry into the directory even after issue of the payment device. For example, a holder of a card of a certain card association can use a metro on a first visit to a city without pre-registration, provided the metro accepts cards of that card association and supports the ticket processing according to this invention.

The known card of U.S. Pat. No. 7,527,208 B2 requires two touches at an access point for pre-registration, whereas a card according to the invention needs no pre-registration and can be used immediately. This is because any given card acceptor (such as a transit authority) who has technical knowledge of the necessary commands and command data structures, is able to insert an entry into a free slot in the directory and write their own ticket data (in their own proprietary format) into the second region, without the operational and logistical complexities of having to share cryptographic keys with card issuers or agreeing data formats for tickets. Card acceptors may use each other's tickets, provided they give access to each other's tickets.

The directory preferably includes a storage location for a pointer corresponding to an entry to a ticket or ticket structure written to the second region. The pointer may be stored in the entry or it may be stored elsewhere in the directory. The pointer may refer to a ticket structure for card acceptors that require a multiplicity of data to be stored on the payment device. The ticket structure may include a proprietary directory of the card acceptor. The storing of ticket data in the second region distinct from the ticket directory provides flexibility to the payment device. This is due to the fact that the second region can be populated entirely according to the requirements of the ticket provider. Any given ticket simply has to have an entry in the ticket directory; its content is parsed by the access point and is effectively a black box as far as the payment device is concerned.

The ticket interaction includes preferably a transfer of content of the directory from the payment device to the access point. This transfer can be carried out with a single command and is therefore relatively fast; in one arrangement directory information is included by way of a response to a standard command, and thus effectively piggy-backs the additional directory information onto a standard, and thus existing, response message. The content of the directory can then be searched by the fast processor of the access point for entries relevant to the card acceptor operating the access point. Since the format of the directory is preferably standardized, the search can be carried out in the same manner at all access points. When a relevant entry is found, a pointer will indicate where the ticket or ticket structure on the card can be retrieved. A standardized directory facilitates access to the tickets when several card issuers use the payment device for storing ticket data using their own formats.

The directory entry and/or the ticket may include an expiry record, indicating when the ticket may be deleted. The expiry record may contain an expiry date or an expiry counter, the former of which indicates when a given ticket is no longer in use and can be deleted. Generally, the expiry record provides a means for cleaning up the memory, both the first region with the directory and the second region with the tickets. An expiry counter can be used to protect against erroneous deletions caused by incorrect dates set in access points; for example, if the expiry counter was set to '2', then two consecutive access points would need to determine that a ticket had expired before the ticket is deleted. Preferably, a cleaning step is carried out each time ticketing is carried out, and the functionality for executing the cleaning step is preferably implemented as a part of the second code portion and thus performed by the portable payment device.

In one particular configuration of the program, an amount of payment depends on data in a ticket written at a start of an event and from data at an end of the event. This program is suitable for travel scenarios where a ticket is written into the second memory region by an access point at the start of the travel and the travel time or distance is determined by an access point at the end of the travel, the amount of payment being dependent on the time and/or distance.

The steps performed by the second code portion may include the step of initiating an action carried out through the access point after successful completion of one or more transactions. An example of such an action is the provision of an access signal for opening a gate permitting entrance to an event or a travel system.

The payment transaction may include an authorization step when an amount of payment exceeds a predetermined amount. Payments involving amounts smaller than the predetermined amount may be carried out without authorization, thereby speeding up the payment transaction.

An improved protection can be obtained when the second code portion includes the step of dynamic pass-code authentication.

Another aspect of the invention relates to a method for carrying out the payment interaction and ticket interaction as set out in the preceding paragraphs.

The invention also relates to a portable payment device for communicating with an access point for carrying out a payment interaction and including a memory for storing tickets, the payment device comprising a processor, and a memory storing a program for payment and ticketing according to the invention, and a communication module for communicating data between the payment device and the access point.

In a particular embodiment of the portable payment device, the communication module is a short range wireless communication module.

A further aspect of the invention relates to a program for running on a processor of an access point for carrying out a payment interaction and permitting ticket interaction with a portable payment device communicating with the access point, the program including the step of:
  determining first data relating to the payment interaction and second data relating to the ticket interaction;
  combining the first data and the second data in one processing command; and
  transferring said processing command to the payment device for carrying out the payment interaction and the ticket interaction.

Transferring the two types of data in a single command from the access point to the payment reduces processing time. The combination of data in a single command is only feasible if the payment and ticketing interaction in the payment device are carried out in one application, such as is provided by the second code portion.

A still further aspect of the invention relates to an access point for communicating with a portable payment device for carrying out a payment interaction and permitting ticket interaction, the access point comprising a processor and a memory storing a program according to the invention, and a communication module for communicating data between the access point and the payment device.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

The present invention relates to a portable payment device, such as a credit, debit or prepaid card. When such a card is provided with a microprocessor or a microchip, it is often called a smartcard. The payment device covers not only cards, but also key fobs, key rings, mobile phones and personal digital assistants. The payment device is adapted for carrying out at access points payment transactions and for reading/writing/erasing data in records called 'tickets' in the memory of the payment device.

Figure 1:
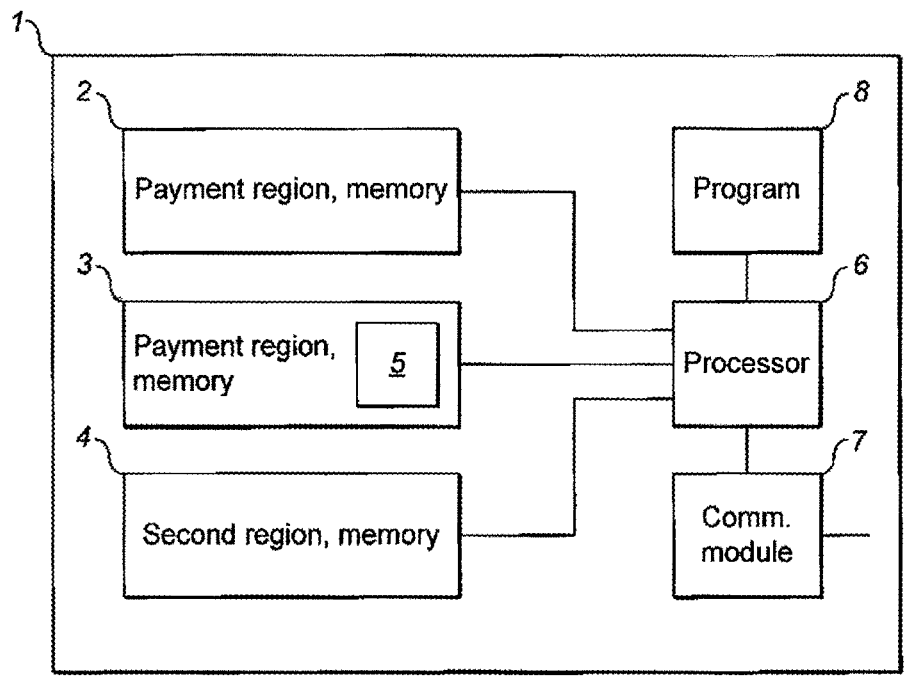
FIG. 1 shows a functional block diagram of a payment device according to the invention.

FIG. 1 shows a functional block diagram of a payment device 1 according to an embodiment of the invention. A memory of the payment device is split in three different parts, each for storing specific data and each having its own protection. A first part of the memory is the payment region 2, for storing data relating to payment transactions, such as PIN, payment account number, etc. Access to the payment region is limited to applications that carry out payment interactions. A second part of the memory is the first region 3, accessible by all card acceptors.

A third part of the memory is the second region 4, for storing tickets. Access to the second region is governed by the permissions granted by the card acceptors that have written the tickets; thus, for example if a card acceptor does not provide a bespoke protection mechanism, their ticket data will be accessible by any third party with access to the second region 4. The first region 3 includes a directory 5 for providing access to the tickets from access points.

A chip 6 of the payment device is a control module for executing data processing operations on data stored in the memory (2, 3, 4) under control of a program 8. The chip may be any processor that can be integrated in the payment device. The program 8 executed by the chip may be stored in a further region of the memory, or indeed in the first part of the memory 2. While in the afore-description and indeed the arrangement shown in FIG. 1 the chip 6 is described and depicted as comprising a processor and being physically distinct from the memory, it will be understood by the skilled person that the chip 6 could alternatively comprise both the memory and processor and thus be integrated on a single chip. Such an implementation is common in the above-mentioned smartcards.

The payment device exchanges data with an access point through a communication module 7. The communication may be through direct electrical contact between the payment device and the access point. Preferably, the communication is contactless, employing a short range wireless communication device using e.g. infrared, RF or Bluetooth.

Figure 2:
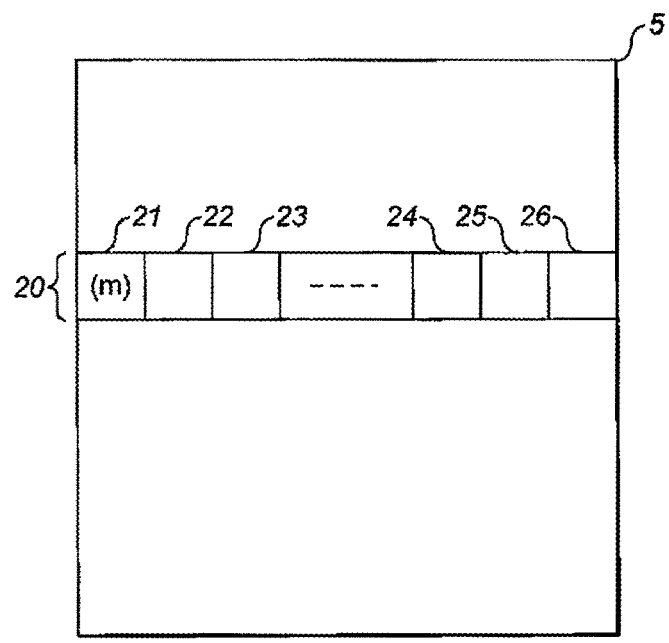
FIG. 2 shows the format of the directory of the memory.

FIG. 2 shows the format of the directory 5 of the memory. The format is preferably pre-determined to provide a well-defined access to the tickets in the memory. The first entry may have a particular format and contain general information about the directory and the collection of tickets stored in the second region 4 of the memory. The remaining entries may share a common format, which is different to that of the first entry. The mth entry 20 ($1 \leq m \leq n$) is shown in the Figure, n being the number of directory entries. The record includes a series of fields 21-26. The first field 21 of the entry 20 contains a number indicating the number of the record in the directory. The second field 22 contains an identifier representing the card acceptor that has written this entry pointing to his tickets. The identifiers are preferably assigned by the card association or, more preferably, by an independent organization arranging for all card associations that the same identifier is assigned to a card acceptor by each card association. The latter should avoid that a card acceptor has to write an entry dependent on the card association of the card using different identifiers and that two different card acceptors use the same identifier. The identifier may include a region code.

The third field 23 of the entry 20 contains a lock code, indicating whether a ticket is locked. If the ticket is locked, it cannot be modified, unless the correct lock data is supplied. A locked ticket can be read using the common read record command. Writing and updating of a locked ticket requires use of a processing command, such as a special extended version of the known GPO command, providing the correct lock data.

Field 24 indicates the status of the ticket to which the entry refers. Possible values of the status are 'inactive', 'short term', 'long term' and 'secured'. An inactive ticket is available for use. The life of a short term ticket expires the day after it is written or updated. A long term ticket has a life longer than one day. A secured ticket has no expiry date and can be used for storing details of concessionary entitlements or season tickets or for reserving space for a specific card acceptor. A secured entry and ticket can be written as part of the card personalization process by the issuer of the card (issuer secured) or by post issuance scripting by the issuer or by a card acceptor (issuer or acceptor secured). The status value can be used to clear memory space, e.g. by making a ticket inactive if it has expired. The program run by the payment device may carry out a check for memory space each time the payment device communicates with an access point and make space available where possible. The card issuer or the card association may set rules for the maximum number of entries to manage the memory space.

Field 25 of the entry 20 contains a transaction counter, which is incremented when the content of a ticket is changed. Field 26 of the entry 20 contains a pointer to the location of the ticket in the second region 4 of the memory. In preferred arrangements the transaction counter can be used by the card acceptor to encrypt data stored in the second region 4.

Field 27 contains a ticket identifier, i.e. a record number in a file of tickets within the second region 4 of the memory.

An entry in the directory may point to a single ticket, allowing several entries made by the same card acceptor. Alternatively, a card acceptor has a single entry in the directory and a plurality of tickets of the card acceptor can be accessed through this single entry.

In cases where a card acceptor may have data storage requirements that exceed the capacity of records contained within second region 4 of the memory, by prior arrangement with an issuer, a card acceptor could reserve additional space on the card (within the second region 4 or elsewhere in a special area of memory). This additional storage area could be used, for example, to store a digital image of the cardholder if photo-identification is required for special concessionary tickets. Presence of this additional storage area could be identified, for example, by the presence of a reserved data element at the start of the card acceptor's record within the ticket file in the second region 4.

Figure 3:
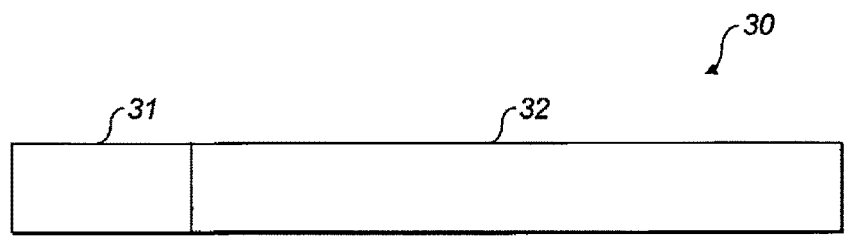
FIG. 3 shows the format of a ticket.

FIG. 3 shows the format of a ticket 30 stored in the second region 4 of the memory. The ticket comprises two parts, a private data section 31 and a public data section 32. The public data section may comprise one or more blocks of secured ticket data and/or one or more blocks of not-secured ticket data. For example, it may comprise one block of not-secured ticket data or one block of secured ticket data followed by a block of not-secured ticket data. The private data section 31 includes management data for the ticket, such as a ticket expiry date, ticket lock data, expiry counter and the length of the secured data block and/or the length of the not-secured data block. The lock data is preferably implemented in the form of a flag identifying whether or not the record is locked plus a block of data comprising the lock itself. If the length of the secured data is fixed for each ticket, the length need not be recorded in the secured data block. The format of the ticket data blocks is proprietary to the card issuer or card acceptor. The data in the private data section 31 cannot be read using the common read record command. The ticket data in the public data section 32 can be read using the read record command. The not-secured ticket data can be written, updated and erased using processing commands, though optionally a card acceptor can choose to protect this data using a an appropriately configured lock, e.g. via lock data stored in the private data section 31; the secured ticket data can be written at issuance of the card or later using a script command. Similarly, and as mentioned above, the transaction counter can be used as part of the ticket data for encryption.

Figure 4:
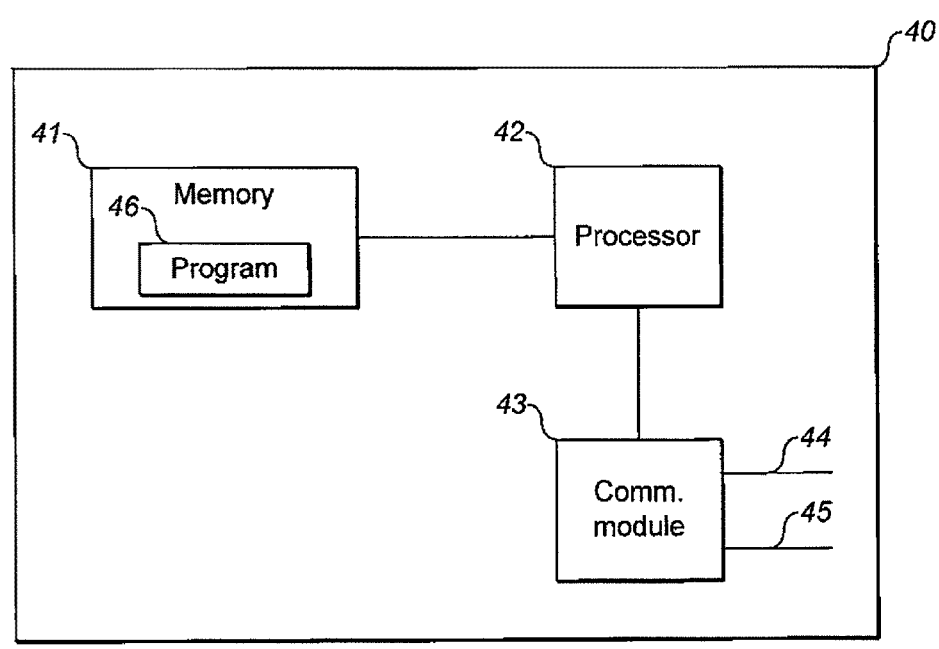
FIG. 4 shows a functional block diagram of an access point according to the invention.

FIG. 4 shows a functional block diagram of an access point 40 for communicating with the payment device 1 shown in FIG. 1. The access point is a device comprising a memory 41 and a processor 42. The memory stores data and program 46 for running on the processor. The access point exchanges data through a communication module 43. Channel 44 for communication with a payment device 1 may use direct electrical contact between the payment device and the access point. Preferably, the communication is contactless and uses a wireless mechanism such as infrared, RF or Bluetooth. Channel 45 is provided for communication with a central processor of the card acceptor or card issuer. This channel may use direct electrical contact or may be wireless.

Figure 5A:
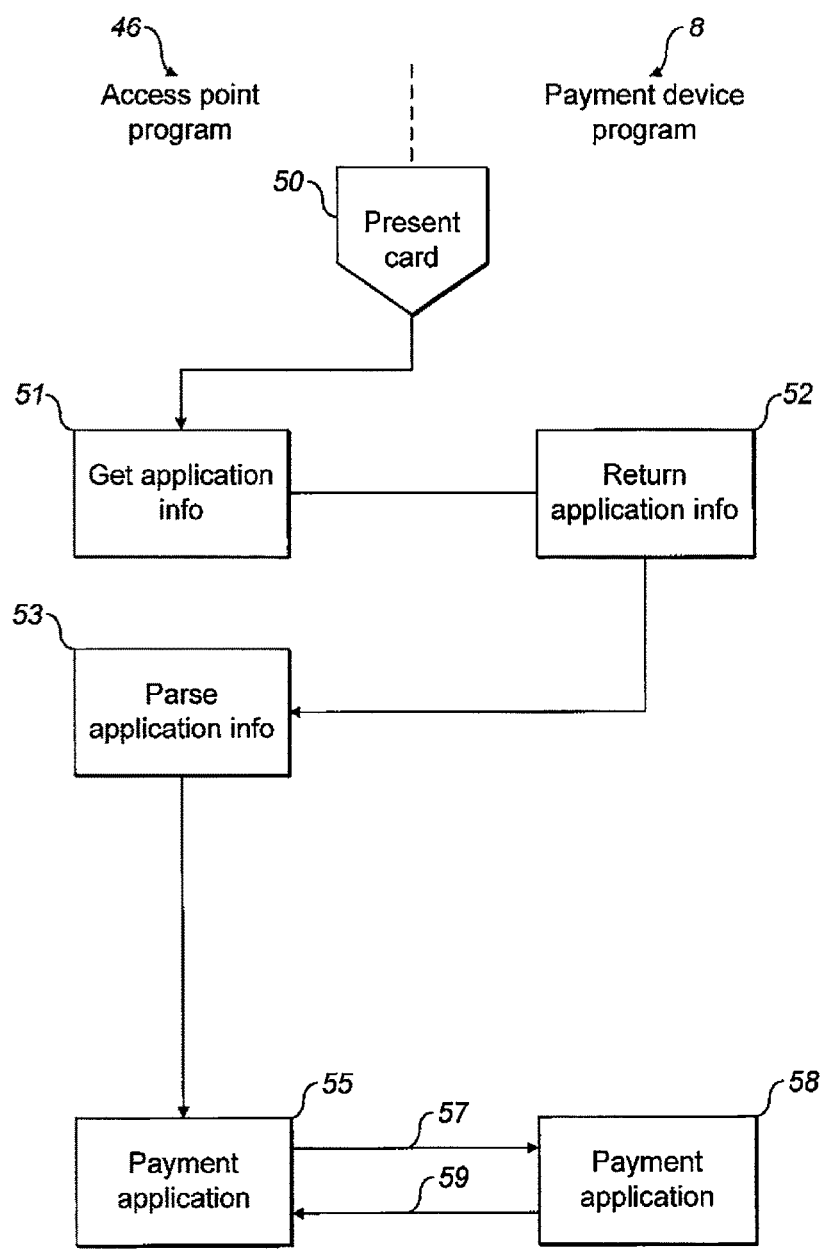
FIG. 5a shows a block diagram illustrating operation of the program according to an embodiment of the invention when the payment device does not include ticket information.
Figure 5B:
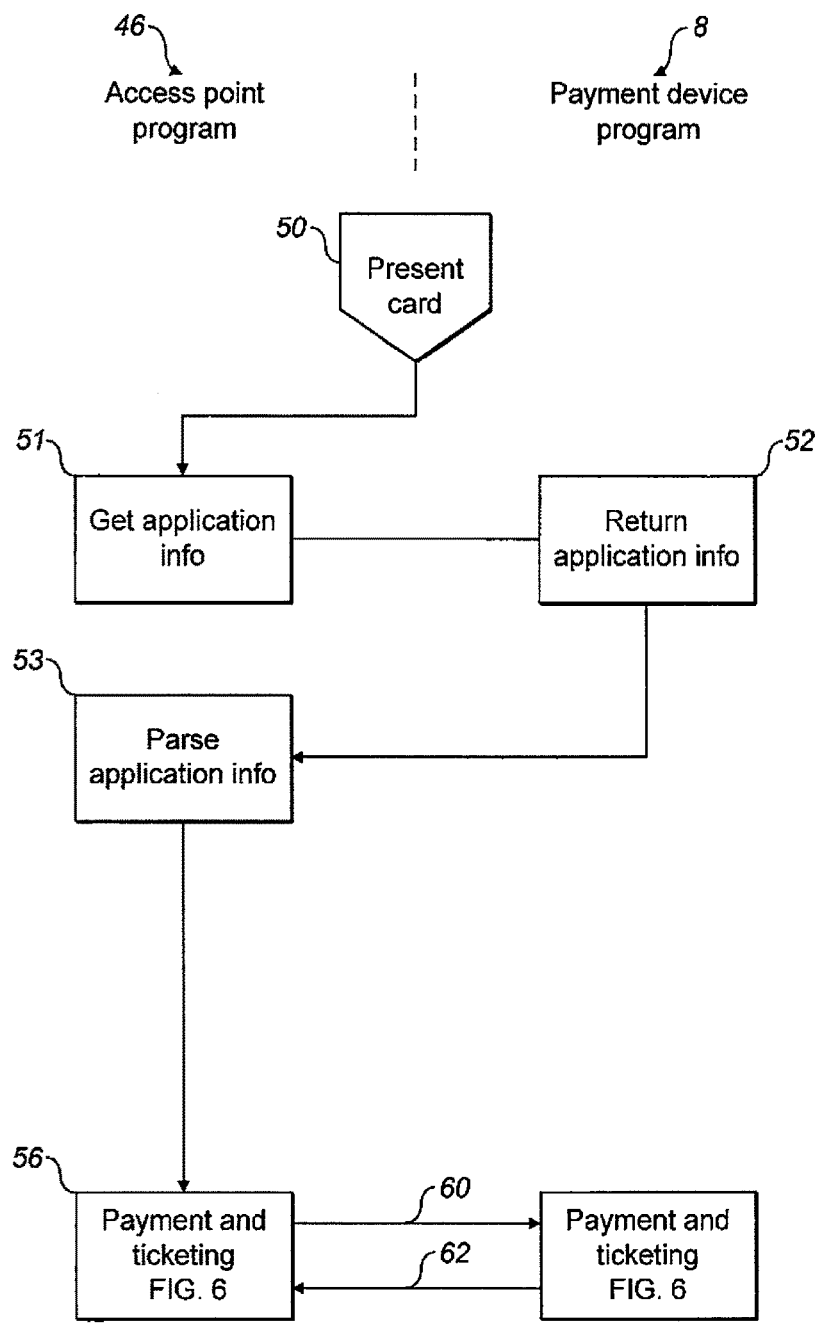
FIG. 5b shows a block diagram illustrating operation of the program according to an embodiment of the invention when the payment device comprises ticket information.

FIGS. 5a and 5b show a block diagrams illustrating aspects of programs 8, 46 for invoking payment interaction or payment and ticketing interaction. The Figures shows a mixture of discrete steps (51, 52, 53) and functionality corresponding to programs 8, 46, together with commands and information sent between the devices (57, 59; 60; 62). The programs are indicated as an access point program 46, stored in the memory 41 and running on the processor 42 of the access point (see FIG. 4) and a payment device program 8, stored in the region 2 of the memory and running on the processor 6 of the payment device. Steps and code portions shown on the left hand side of the Figure are associated with the access point program; those shown on the right hand side correspond to the payment device program.

When a payment device such as a credit card is presented to an access point in step 50, the access point program requests in step 51 information from the payment device which applications the device can run. According to conventional methods, the card program returns in step 52 the requested information. The information is parsed by the access point program in step 53. If the information received from the payment device does not include ticketing information, the access point executes a payment application 55. If the information received from the payment device includes ticketing information, the access point executes a ticketing and payment application 56, as indicated in FIG. 5b. If ticket interaction is required and the payment device does not support ticketing, the access point may reject the payment device and inform the card holder accordingly, for example by a message on a display. Steps 51, 52 and 53 are typically executed even if the access point does not require ticket interaction, such as in a common POS transaction. The step 53 may be accompanied by a step checking whether the payment device presented is one of an accepted card association and/or is valid.

In the event that the information received from the payment device does not include ticketing information, the payment application 55 of the access point program 46 sends a message via a command 57 to the payment device (the first message), the command requesting payment interaction. Upon receipt of the command by the payment device program 8, the payment device program 8 starts a first code portion 58 for payment interaction; this code portion does not carry out any ticket interaction. Having executed the first code portion, the first code portion 58 may transfer, via data 59, information relating to the payment to the payment application 55. The first code portion 58 may be a payment application as used in known credit cards.

Alternatively, and referring to FIG. 5*b*, in the event that the card sends ticketing information at step 52, the payment and ticket application 56 of the access point program 46 sends a command 60 to the payment device, the command 60 indicating the need for ticket interaction. The card program 8 determines from the content of the command that ticket interaction is required, executes a second code portion for payment and ticketing and sends ticket-related information to the access point as will be described below with reference to FIG. 6. For example, information about the payment and ticket interaction may be transferred to the payment and ticket application 56 of the access point program 46 via command 62.

Figure 6:
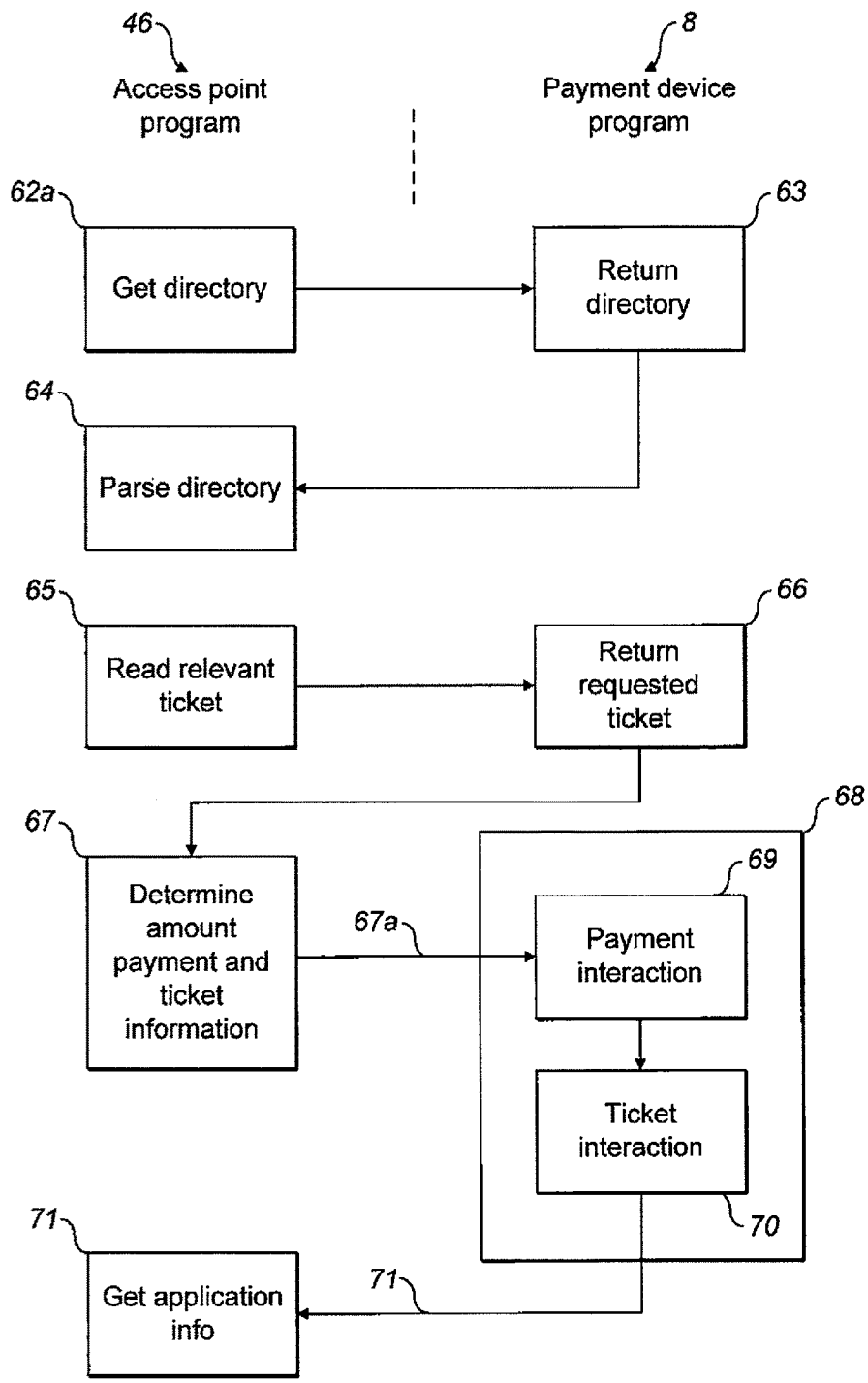
FIG. 6 shows a block diagram illustrating operation of the program when invoking payment and ticket interactions of the second code portion according to an embodiment of the invention.

FIG. 6 shows a block diagram of the steps executed by the access point and the payment device under control of respective programs 8, 46. Each program comprises instructions that cause the respective device to perform the steps shown in the relevant part of the Figure; the division of the steps executed by the access point and the payment device is the same as in FIG. 5.

Upon receipt of ticketing data (command 62), the payment and ticket application 56 of the access point program 46 requests in step 62*a* the data of the directory 5 of the payment device. In response the card program 8 returns the content of the directory in step 63.

The access point application 56 parses in step 64 the directory to find entries of the directory relevant for the present transaction between the access point and the payment device. For example, if the transaction relates to entry in a transit system, the parsing will retrieve tickets previously written by the transit system by looking for the identifier of the transit system in field 22 of each directory entry. One of the tickets may contain a season ticket for the transit system or a reduction pass. The parser may also search for tickets of other card acceptors or card issuers that may be relevant for the present transaction. An example is a ticket providing data of on old age pensioner's concession. Another example is where a bus company A has an agreement with bus company B, such that if a cardholder travels a contiguous route first on a company A bus, immediately followed by a company B bus, he will receive a discount on the second part of the journey.

The parser may also determine the space available for new entries in the directory and for tickets in the second region of the memory. If necessary it may carry out a cleaning step, making expired entries and tickets available.

In step 65 a command is given to the payment device to read the one or more relevant tickets. The data of the requested tickets is returned to the access point by the program 8 in step 66. If there are no relevant tickets, steps 65 and 66 may be omitted.

The access point subsequently determines the amount to be paid and the required ticket interaction in step 67. Any ticket retrieved from the payment device in the previous step may be authenticated before its data is used. The amount to be paid may depend on the ticket data. For example, the entry fee for an event may be reduced because of a concession stored in a ticket, or the transit fare may be capped because the card holder would otherwise exceed a maximized fare for the day as made apparent by tickets of previous transits still in the payment device. When exiting a transit system, the fare may be determined from the data of the ticket written on entering the system combined with the location or time of exiting the system.

When the amount cannot yet be determined, it may set it to a pre-determined amount, for example zero. This applies on entry to a transit system where the fare depends on the distance or time travelled. The pre-determined amount may be set at the maximized fare for a day and on exiting the transit system, when the exact fare will be known, the amount is corrected; this avoids a free ride when the card holder forgets to touch out when exiting the transit system.

The access point also determines the required ticket interaction to be carried out. This may involve writing a new ticket, for example an entry ticket for an event or an access ticket to a transit system, updating data of a ticket or making ticket space available again because the data is no longer required, or updating a ticket with bonus points by adding points gained with a purchase. The ticket interaction may also involve updating the directory. For example, on first use of a transit system, the transit operator will make an entry in the directory having its identifier; any ticket written by the operator will be linked directly or indirectly to the entry. Such first use does not require pre-registration of the payment device with the operator. The ticket data for the payment device may include lock data required for modification of a locked ticket. This lock data will also be generated in step 67.

The amount to be paid and the data for the ticket interaction are transmitted to the payment device via a message comprising a single command 67*a* (the second message). The data for the ticket interaction includes data for any updating of the directory. This command may be a processing command, such as a modified form of the common GPO command. The ticket data may be encoded. For example, they may be encrypted for confidentiality before transfer to the payment device to restrict access to the data. The data may be protected for integrity by adding e.g. a CRC or MAC to the data. The encoded data is stored in the ticket in encoded form.

On receipt of the command 67*a*, the program 8 of the payment device determines from the content of the command that payment and ticketing interaction are to be executed and accordingly invoke the second code portion 68. The second code portion 68 involves payment interaction steps, referred to generically as reference 69 and ticket interaction steps, referred to generically as reference 70. Although the Figure shows that the payment interaction steps are executed before the ticket interaction steps, the ticket interaction may alternatively be executed first.

The payment interaction steps 69 may be a usual payment interaction carried out on a smartcard. It may include authorization of the payment, anti-tearing measures and a risk-based management process. The interaction may involve reading and writing in the payment region 2 of the payment device memory (see FIG. 1). The amount to be paid may be subtracted from a balance stored in the payment region of a prepaid payment device. For credit and debit payment devices the payment interaction may approve the payment transaction offline or request for online authorization. When the amount to be paid is below a certain threshold, offline approval may be regarded as sufficient. A pending online authorization may be recorded in a ticket for future use.

In a special embodiment the payment interaction may omit the step of payment processing, e.g. where the amount to be paid is zero, but include the step providing an electronic signature to prove that the payment device is genuine. If the payment transaction cannot be completed successfully, the ticket interaction may be skipped and the failure may be reported to the access point.

The ticket interaction steps 70 will involve any writing and updating of the directory and the tickets in the first region 3 and the second region 4 of the memory of the payment device (see FIG. 1). The command 67a may provide data for making a locked ticket modifiable and for locking the updated ticket. Similarly, it will provide new lock data for a newly written ticket that has to be locked.

It is to be understood that the payment functionality of the first code portion 58 is preferably identical to payment functionality invoked by the second code portion 68. Furthermore, in at least one arrangement, execution of the second code portion 68 involves execution of part or all of a first code portion 58. More specifically, in at least some embodiments the instructions making up the first code portion can be common to the first code portion 58 and the second code portion 68, meaning that there is only one and the same instance of code that is executed in either case. This arrangement is particularly advantageous because it avoids duplicating the storage of executable portions common to the payment interaction and the payment plus ticketing interaction. Alternatively there may be two instances of the payment functionality: one embodied as part 58, and another embodied separately in part 68.

Upon execution of the second code portion 68, a response 71 to the processing command 67a is sent to the access point. The content of the response informs the access point of the status of the interactions in the payment device. A successful payment may initiate an action to open a gate to a transit system or an event. Any failure of the payment transaction reported can be notified to the card holder, refusing him for example access to an event or transit system and/or asking him to seek assistance. A request for online authentication including authentication data will be communicated through channel 45 (see FIG. 4) to a central server for processing. Any action of the access point following such a request is policy of the card acceptor; it may include conditional entry and a check of the authorization on exit.

The programs of the access point and the payment application are preferably provided with an anti-tear mechanism to ensure that if a tear occurs, both offline payment risk management parameters and all payment data and ticket data are restored to their previous values. In one embodiment the payment and ticket code portion 68 sets a flag in the payment device when step 70 has completed. The access point should recognize a tear if the communication with the payment device is interrupted prematurely and inform the card holder accordingly. In one arrangement, if during the next interaction between the same or another access point and the payment device it is noticed that the flag was not set during the previous interaction, a roll-back operation should be carried out before any subsequent payment or ticket interaction is allowed to proceed. The flag may be set in the file with application information.

Thus in preferred arrangements, the payment device sets a flag when all payment and ticketing processing are completed, immediately prior to the final response to the access point (step 71). If, during the start of the next interaction between the same or another access point the payment device determines that this flag was not set during the previous interaction, a roll back should be carried out before any ticket related data is provided to the access point.

The above embodiments are to be understood as illustrative examples of the invention. Further, the terminology utilized to describe embodiments of the invention is to be understood as providing a succinct characterization of the invention. In particular, and as will be appreciated from the foregoing, payment interaction is described as being embodied as a first code portion having first computer-readable instructions and combined payment and ticketing is described as being embodied as a second code portion having computer-readable instructions corresponding to payment interaction and second computer-readable instructions corresponding to ticketing interaction. These combined instructions map directly to at least the steps 69, 70 shown in FIG. 6 and are depicted in combination with the relevant second code portion 68.

In an alternative characterization, embodiments of the invention could be defined as a program 8 for running on a processor 6 of a portable payment device for carrying out a payment interaction and permitting ticket storage in a memory of the portable payment device, the program 8 being configured to interact with an access point 40 and including a first set of instructions, a first code portion 58 and a second code portion 68, the first set of instructions, when executed by the chip, causing the portable payment device to perform the steps of:
  responsive to a first message from a said access point, executing the first code portion 58;
  responsive to a second message from the access point, executing the second code portion 68,
  the first code portion including a second set of instructions corresponding to the payment interaction, and
  the second code portion comprising including a third set of instructions corresponding to the payment interaction and including a fourth set of instructions corresponding to the ticket interaction.

In this alternative characterization, the first set of instructions is embodied within the program 8 and used to control the receipt of and response to messages 57, 60, 67a from the access point, and indeed invocation of the first and second code portions dependent on the content of the first and second messages 57, 67a in the manner described above. The instructions associated with payment interaction may be common to the first and second code portion, such that the second set of instructions and the third set of instructions are the same instance of executable code. Alternatively, the second set of instructions may be embodied separately from the third set of instructions.

As will be appreciated by the skilled person, a set of instructions includes one or more instructions.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A portable payment device comprising:
  a memory configured to store a first code portion including instructions related to a payment interaction, a second code portion, and stored ticket data;
  a communication module;
  a processor; and a non-transitory computer readable medium, the non-transitory computer readable medium comprising code executable by the processor to implement a method comprising:
  receiving, via the communication module, a message from an access point;
  determining that the message comprises an amount to be paid and data for a ticket interaction;
  in response to receiving the message, executing the second code portion, wherein the second code portion includes instructions related to a combined interaction including both a ticketing part and a payment part, wherein the ticketing part includes instructions for writing or updating the ticket data in the memory of the portable payment device according to the data for the ticket interaction, and wherein the second code portion is a unitary code portion; and
  providing a response to the access point responsive to the received message, wherein the response includes content that informs the access point of interactions in the portable payment device and initiates opening of a gate.

2. The portable payment device of claim 1, wherein the second code portion further includes instructions related to received data relating to the combined interaction in one processing command, and wherein the received data is received from the access point.

3. The portable payment device of claim 1, wherein the combined interaction is capable of processing an amount of payment, and wherein the amount of payment processed is zero when the combined interaction does not require payment.

4. The portable payment device of claim 1, wherein the stored ticket data associated with the combined interaction comprises data transferred from the access point to the portable payment device in an encoded form, and wherein the stored ticket data associated with the combined interaction is stored in the encoded form.

5. The portable payment device of claim 1, wherein the memory further comprises:
  a first region configured to store a ticket directory having entries that identify card acceptors; and
  a second region configured to store tickets of the identified card acceptors, the second region being dynamically configurable.

6. The portable payment device of claim 5, wherein the stored ticket directory has a predetermined format, and wherein the stored ticket directory entries are writable, readable, and erasable based on data received from the access point, and wherein the access point is configured to accept payment from the portable payment device.

7. The portable payment device of claim 6, wherein the stored ticket directory includes storage for a pointer, wherein the pointer points from one of the entries that identify the card acceptors to data indicative of a ticket.

8. The portable payment device of claim 7, wherein the instructions related to the combined interaction, when executed by the processor, cause the portable payment device to write ticket data to the second region of the memory, wherein the ticket data is stored in the second region of the memory, and wherein the ticket data is stored in a format controlled by one of the identified card acceptors.

9. The portable payment device of claim 8, wherein the instructions related to the combined interaction, when executed by the processor, cause the portable payment device to transmit data stored in the ticket directory from the portable payment device to the access point.

10. The portable payment device of claim 1, wherein the response to the message is received by the access point while the portable payment device is in direct electrical contact with the access point.

11. The portable payment device of claim 1, wherein the message from the access point is received by the portable payment device while the portable payment device is in direct electrical contact with the access point.

12. A method that uses a portable payment device comprising a memory configured to store a first code portion including instructions related to a payment interaction, a second code portion, and ticket data, a communication module, a processor, and a non-transitory computer readable medium, the method comprising:
  receiving, by the processor via the communication module, a message from an access point;
  determining, by the processor, that the message comprises an amount to be paid and data for a ticket interaction;
  in response to receiving the message, executing, by the processor, the second code portion, wherein the second code portion includes instructions related to a combined interaction including both a ticketing part and a payment part, wherein the ticketing part includes instructions for writing or updating the ticket data in the memory of the portable payment device according to the data for the ticket interaction, and wherein the second code portion is a unitary code portion; and
  providing, by the processor, a response to the access point responsive to the received message, wherein the response includes content that informs the access point of interactions in the portable payment device and initiates opening of a gate.

13. The method of claim 12, further comprising:
  initiating an action carried out through the access point after completion of one or more combined interactions.

14. The method of claim 12, wherein the processor in the portable payment device authorizes payment when an amount of payment associated with one or more of the payment interaction and the combined interaction exceeds a predetermined amount.

15. The method of claim 12, wherein the processor performs dynamic pass-code authentication.

16. A method comprising:
  providing, by an access point comprising a processor to a portable payment device comprising a processor and a memory configured to store a first code portion including instructions related to a payment interaction, and a second code portion, via a communication module, a message, the portable payment device configured to (i) determine that the message comprises an amount to be paid and data for a ticket interaction, and (ii) execute the second code portion, wherein the second code portion includes instructions related to a combined interaction including both a ticketing part and a payment part, wherein the ticketing part includes instructions for writing or updating ticket data in the memory of the portable payment device according to the data for the ticket interaction, and wherein the second code portion is a unitary code portion; and
  receiving a response by the access point comprising the processor from the portable payment device, wherein the response includes content that informs the access point of interactions in the portable payment device and initiates opening of a gate.

17. The method of claim 16, wherein the access point is a second access point, the message is a second message and the response is a second response, the method further comprising:
  providing, by a first access point to the portable payment device, a first message, wherein the portable payment device (i) determines that the first message does not include ticket information, and (ii) executes the first code portion wherein the first code portion includes instructions related to the payment interaction; and
  receiving a first response from the portable payment device, wherein the first response includes information about the payment interaction.

18. The method of claim 16, wherein the portable payment device is a card.

19. The method of claim 16, further comprising:
  opening the gate.

20. The method of claim 16, wherein the memory further comprises:
  a first region configured to store a ticket directory having entries that identify card acceptors; and
  a second region configured to store tickets of the identified card acceptors, the second region being dynamically configurable.

* * * * *